(12) United States Patent
Wehling et al.

(10) Patent No.: US 7,929,377 B2
(45) Date of Patent: Apr. 19, 2011

(54) ULTRASOUND SENSOR, IN PARTICULAR, A MOTOR VEHICLE ULTRASOUND SENSOR

(75) Inventors: Hans-Wilhelm Wehling, Heilbronn (DE); Uwe Kupfernagel, Vailhingen (DE); Dietmar Gruedl, Asperg (DE); Thomas Jung, Heilbronn (DE); Heinrich Gotzig, Heilbronn (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 292 days.

(21) Appl. No.: 12/304,233

(22) PCT Filed: May 24, 2007

(86) PCT No.: PCT/EP2007/004621
§ 371 (c)(1),
(2), (4) Date: Dec. 10, 2008

(87) PCT Pub. No.: WO2007/144065
PCT Pub. Date: Dec. 21, 2007

(65) Prior Publication Data
US 2009/0196121 A1    Aug. 6, 2009

(30) Foreign Application Priority Data
Jun. 14, 2006   (DE) .......................... 10 2006 028 214

(51) Int. Cl.
*G01S 15/00*    (2006.01)
*H04R 31/00*    (2006.01)

(52) U.S. Cl. ...................................................... 367/140
(58) Field of Classification Search .................. 367/140, 367/188, 173, 174, 176, 165, 163, 162
See application file for complete search history.

(56) References Cited

U.S. PATENT DOCUMENTS

| | | | | |
|---|---|---|---|---|
| 3,890,513 | A | * | 6/1975 | Barleen et al. ................ 310/324 |
| 2009/0196121 | A1 | * | 8/2009 | Wehling et al. ................. 367/87 |
| 2010/0229649 | A1 | * | 9/2010 | Jung et al. ...................... 73/649 |

FOREIGN PATENT DOCUMENTS

| | | |
|---|---|---|
| DE | 197 52 921 A1 | 6/1999 |
| DE | 199 37 195 A1 | 2/2001 |
| EP | 1 260 965 A | 11/2002 |

OTHER PUBLICATIONS

International Search Report w/translation from PCT/EP2007/004621 dated Nov. 30, 2007 (4 pages).

* cited by examiner

*Primary Examiner* — Dan Pihulic
(74) *Attorney, Agent, or Firm* — Osha • Liang LLP

(57) ABSTRACT

Ultrasound sensor (2), in particular motor vehicle ultrasound sensor, having a housing (4), having a diaphragm (6) which is mounted in or on a section (12) of the housing (4), and having a decoupling element (10) which extends at least partially between the diaphragm (6) and the housing section (12), wherein the decoupling element (10) and the housing section (12) have latching means (14) by means of which the decoupling element (10) and the housing section (12) are connected to one another.

15 Claims, 3 Drawing Sheets

ULTRASOUND SENSOR, IN PARTICULAR, A MOTOR VEHICLE ULTRASOUND SENSOR

The invention relates to an ultrasound sensor, in particular a motor vehicle ultrasound sensor, having a housing, having a diaphragm which is mounted in or on a section of the housing, and having a decoupling element which extends at least partially between the diaphragm and the housing section.

The diaphragm of such an ultrasound sensor usually has a diaphragm floor which can be made to oscillate using a piezo element, with the result that ultrasound signals can be irradiated into the surroundings of the ultrasound sensor. Ultrasound signals which are reflected by obstacles can be received again and processed by the ultrasound sensor.

In order to bring about defined oscillation of the diaphragm or of the diaphragm floor, the diaphragm is not connected directly to the housing of the ultrasound sensor but is instead surrounded by a decoupling material which adjoins an annular housing section of the ultrasound sensor housing radially towards the outside.

An ultrasound sensor whose annular housing section has integrally injection moulded-on openings which are used to encapsulate by injection moulding a diaphragm with decoupling material which is inserted into the annular housing section is known from prior uses. If the following fabrication steps, for example the attachment of the piezo element to the diaphragm floor, cannot be carried out without faults, this results in an ultrasound sensor which is completely or almost completely manufactured having to be thrown away as a reject.

Taking this as a basis, the present invention is based on the object of making available an ultrasound sensor which can be manufactured as cost-effectively as possible.

This object is achieved according to the invention in that the decoupling element and the housing section have latching means via which the decoupling element and the housing section are connected to one another.

The ultrasound sensor according to the invention permits very flexible and therefore cost-effective fabrication. The decoupling element can be made available separately and therefore easily integrated into an assembly process. If faults occur in the following fabrication steps, for example when the piezo element is bonded into the diaphragm, the assemblies which have already been produced can be broken up again, in particular the decoupling element and the housing can be re-used. The decoupling element which is made available separately also provides the possibility of already adapting it in terms of colour, for example surface-coating it, before the ultrasound sensor is assembled.

A further advantage of the decoupling element which is made available separately is the fact that it is subject to fewer structural constraints since it is not produced by encapsulation of adjoining components by injection moulding but rather can be manufactured in a separate injection moulding process.

For the sake of good decoupling between the diaphragm and the housing it is advantageous if the housing section and the decoupling element are embodied in an annular shape. The diaphragm can therefore be decoupled from the housing in terms of oscillation in a plane which is perpendicular to the irradiation direction of the ultrasound sensor.

One advantageous embodiment of the invention provides that the latching means have the latching body and latching receptacle elements, wherein one of the elements is provided on the decoupling element and the other of the elements is provided on the housing section. Of course, it is also possible to combine the aforesaid alternatives with one another so that latching bodies and latching receptacles, which interact with associated latching receptacles and latching bodies, are respectively provided on the decoupling element and on the housing section. Within the scope of this invention, a latching means is understood to be a means by which detachment of the decoupling element from the housing section is opposed by an at least slight degree of resistance so that the decoupling element is reliably held on the housing section.

For the decoupling element to be attached to the housing section as securely as possible it is proposed that a plurality of latching means are provided along the circumference of the housing section and of the decoupling element, which latching means are, in particular, distributed uniformly along the circumference of the housing section and of the decoupling element.

According to one particularly preferred embodiment of the invention there is provision that the decoupling element can be inserted into the housing section in a mounting direction which is opposed to the irradiation direction of the ultrasound sensor. This has the advantage that the housing of the ultrasound sensor can be of relatively narrow design since the decoupling element only has to be inserted into the aforesaid housing section of the housing of the ultrasound sensor. It is therefore not necessary to lead the decoupling element through the housing from the rear. In this way it is possible to provide space for further components, for example printed circuit boards or electrical connecting elements, in the region of the housing facing away from the housing section.

A further advantageous embodiment of the invention provides that the decoupling element and/or the housing section have at least one insertion section which tapers in relation to the mounting direction. Using this insertion section facilitates the joining of the decoupling element and the housing section since the decoupling element and the housing section can align themselves with one another during the joining process by using the insertion section.

One development of the invention provides that at least one stop element, which interacts with a stop face which is formed on the housing or on the housing section, is formed on the decoupling element. In this way, it is possible to easily prevent the decoupling element being able to be pressed inwards into the housing of the ultrasound sensor when a compressive force is applied to said decoupling element.

In addition it is advantageous if at least one undercut region into which the diaphragm can be inserted in a latching fashion is formed on the decoupling element. Since the decoupling element can, as already explained above, be manufactured by means of a separate injection moulding process, the structural freedoms which are produced can be utilized to provide the decoupling element with geometries which would not be possible if the decoupling element were manufactured by encapsulating other components by injection moulding. Since the decoupling element is usually formed from an elastic material, undercut regions can also be manufactured without the use of slider tools being necessary. In an undercut region which is manufactured in such a way, the diaphragm can be inserted in a latching fashion so that it is securely held within the decoupling element.

The decoupling element is of particularly compact design here if the undercut region is bounded at least partially by the stop element. The stop element therefore forms at the same time a material section which serves to secure the diaphragm within the decoupling element.

One particularly advantageous development of the invention provides that the decoupling element has at least one material cutout on its side facing the diaphragm. Such a material cutout can, for example, be embodied in the form of a pocket, and when the diaphragm is mounted within the decoupling element said material cutout forms an air space which prevents oscillations from being transmitted from the diaphragm via the decoupling element to the housing section of the housing and in the opposite direction back to the diaphragm.

In this context, a particularly advantageous decoupling effect can be achieved if the material cutout is aligned in the radial direction with an edge section of the diaphragm, which edge section reinforces the diaphragm in the radial direction. Decoupling in terms of oscillation in this region significantly improves the measurement behaviour of the ultrasound sensor.

Furthermore it is proposed that the decoupling element have undercut elements which project into the housing of the ultrasound sensor and are surrounded by an embedding material which fills the interior of the housing. In this way it is possible for an almost completely assembled ultrasound sensor to be filled with embedding material in a manner known per se, as a result of which the decoupling element is captively secured in relation to the housing after the embedding material has been introduced.

Liquid silicone rubber (LSR) has proven particularly suitable for the material of the decoupling element. This material has largely constant mechanical properties and therefore also largely constant oscillation behaviour over a large temperature range.

The invention also relates to a method for assembling an ultrasound sensor which is characterized by the following steps: a first assembly, in which a piezo element is attached to the diaphragm floor of a diaphragm, is formed first. This first assembly is inserted, in particular in a latching fashion, into a decoupling element in order to form a second assembly. This assembly is in turn inserted in a latching fashion into a housing section of a housing of the ultrasound sensor in order to form a third assembly. In this way it is possible to limit comparatively critical mounting processes such as, for example, the attachment of the piezo element to the diaphragm floor to a small assembly. The mounting of the individual components of the ultrasound sensor by latching them to one another allows the manufacture of the ultrasound sensor also to be automated in a particularly satisfactory fashion.

The decoupling element is particularly advantageously inserted here into the housing section in a mounting direction which is opposed to the irradiation direction of the ultrasound sensor. In this way, the decoupling element does not have to be led through the entire housing of the ultrasound sensor but instead it can be connected to the housing section over a short and more favourable joining line.

Further advantages, features and details of the invention are made from the following description in which particularly preferred exemplary embodiments are described in detail with reference to the drawing. Here, the features which are shown in the drawing and are mentioned in the claims and in the description can each be essential to the invention either individually in themselves or in any desired combination.

In said drawing.

Figure 1:
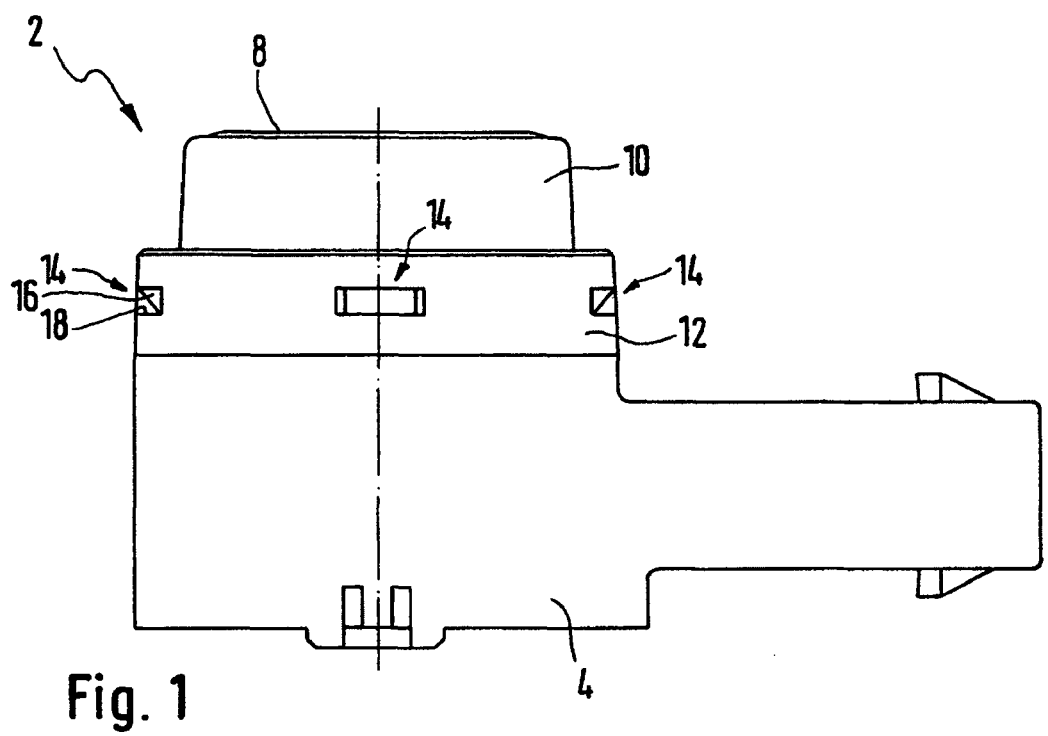
FIG. 1 is a side view of an ultrasound sensor according to the invention with a decoupling element.

In FIG. 1, an ultrasound sensor is denoted in its entirety by the reference symbol 2. Said ultrasound sensor has a housing 4 which is approximately pot-shaped (cf. also FIG. 2). A diaphragm 6 which is of essentially cylindrical design and which has a disc-shaped diaphragm floor 8 is mounted on the housing 4. The diaphragm 6 is surrounded radially on the outside by an annular decoupling element 10 which decouples the diaphragm 6 in terms of oscillation from the housing 4. The decoupling element 10 is mounted on the housing side on an annular housing section 12 which surrounds radially on the outside a part of the decoupling element 10 which faces the housing 4.

Figure 2:
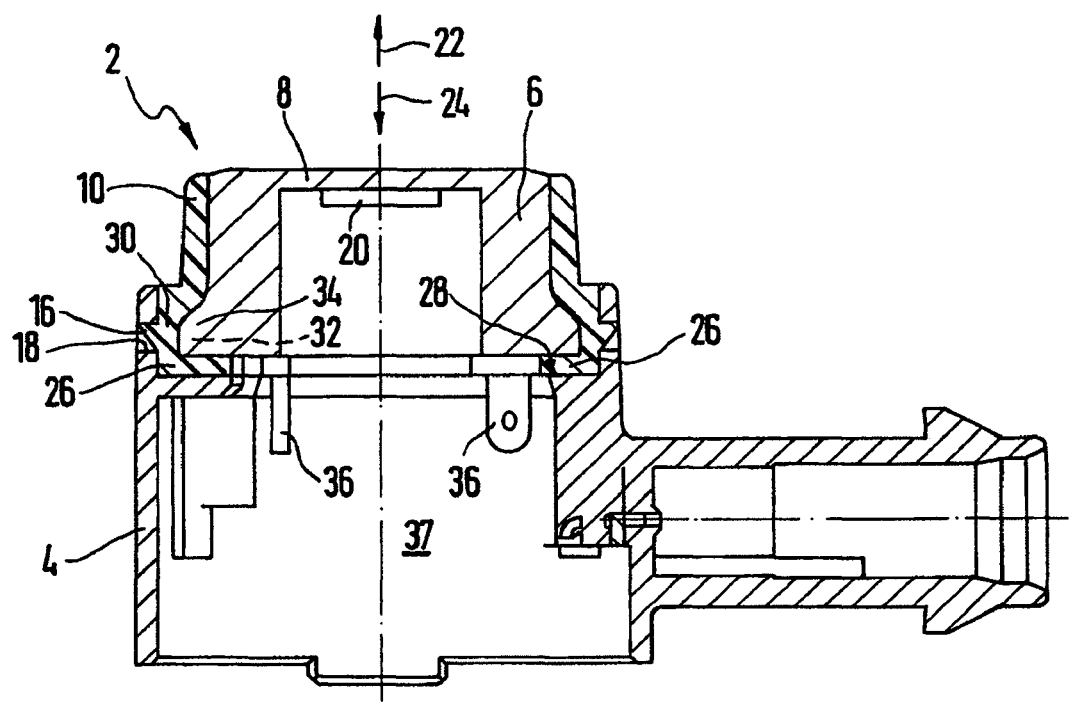
FIG. 2 is a sectional side view through the ultrasound sensor according to FIG. 1.

The decoupling element 10 and the housing section 12 are connected to one another using latching means 14 which are distributed over the circumference of the housing section 12 or of the lower part of the decoupling element 10 in FIGS. 1 and 2. The latching means 14 comprise latching bodies 16 which, according to the illustrated exemplary embodiment, are provided on the decoupling element 10, and latching receptacles 18 which are formed by openings in the housing section 12.

With reference to FIG. 2, the diaphragm 6 has, on the underside of the diaphragm floor 8, a piezo element 20 which can cause the diaphragm floor 8 to oscillate so that said diaphragm floor 8 can generate ultrasound signals corresponding to an irradiation direction denoted by 22. An assembly which is formed from the diaphragm 6 and piezo element 20 can be inserted into the decoupling element 10 in a mounting direction 24 which is opposed to said irradiation direction. The decoupling element is formed from liquid silicone rubber (LSR). It is therefore elastic so that when the diaphragm 6 is inserted into the decoupling element 10 in the mounting direction 24 it can deform and can hold the diaphragm 6 securely after the mounting process is completed.

The assembly which is formed in such a way and which is composed of the diaphragm 6 and the decoupling element 10 can in turn be joined to the housing 4 of the ultrasound sensor 2 in the mounting direction 24. In this context, the latching bodies 16 of the decoupling element 10 latch into the latching receptacles 18 of the housing section 12.

The decoupling element 10 has, on its side facing the housing 4, stop elements 26 which are distributed along the circumference of the decoupling element 10. These stop elements 26 interact with stop faces 28 which are formed in the housing 4, with the result that the mounting position of the decoupling element 10 within the housing 4 or the housing section 12 is defined not only by the latching means 14 but also by the contact between the stop elements 26 and the stop faces 28.

The stop elements 26 form, together with an adjoining annular wall section 30 of the decoupling element 10, undercut regions 32 in which an edge section 34 which reinforces the diaphragm 6 in the radial direction is held. In this way, the diaphragm 6 is reliably secured within the decoupling element 10.

The decoupling element 10 also has undercut elements 36 which face the housing 4 and which can be embodied, for example, as clips or eyelets. If an interior 37 of the housing 4 is filled with embedding material in order to protect the ultrasound sensor 2 and its electrical components against moisture and against dirt, the embedding material surrounds the undercut elements 36 so that the decoupling element 10 is securely fixed relative to the housing 4.

Figure 3:
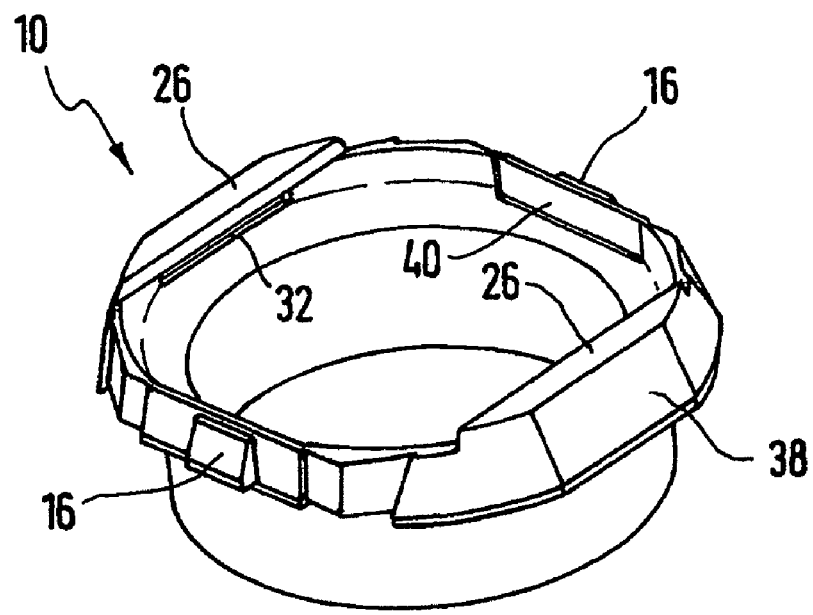
FIG. 3 is a perspective view of a decoupling element of the ultrasound sensor according to FIGS. 1 and 2.

The decoupling element 10 is also illustrated in FIG. 3, and the perspective here is selected such that the stop elements 26 in FIG. 3 are at the top. Adjacent to the stop elements 26, the decoupling element 10 has an insertion section 38 which tapers in the direction of the stop element 26 and which facilitates the insertion of the decoupling element 10 into the housing section 12 of the housing 4.

The decoupling element 10 also has pocket-shaped material cutouts 40 which are distributed along the circumference of the decoupling element 10. These material cutouts serve to decouple the decoupling element 10 in terms of oscillation from the diaphragm 6 so that oscillations from the diaphragm 6 cannot be transmitted via the decoupling element 10 into the housing section 12 and therefore to the housing 4.

Figure 4:
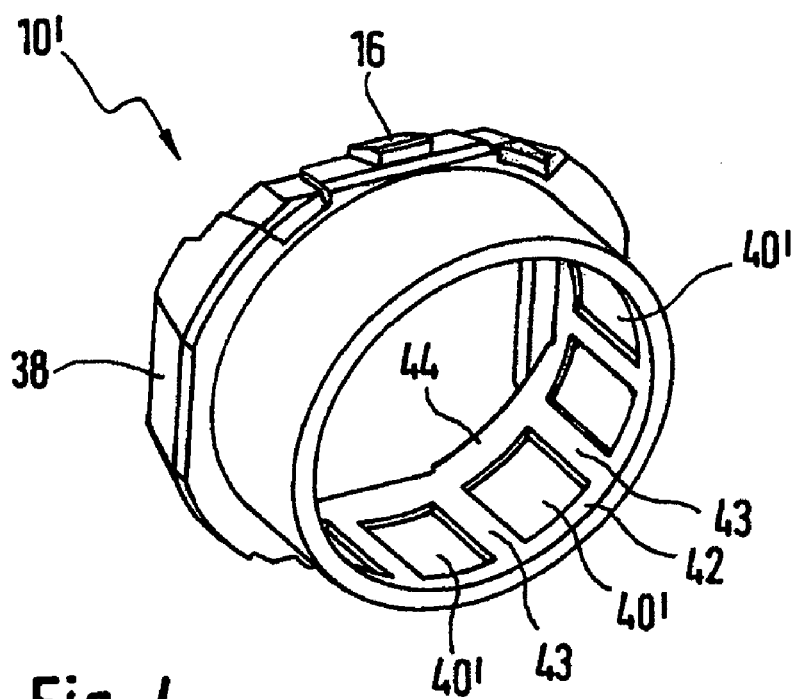
FIG. 4 is a perspective view of a further decoupling element.

The further decoupling element 10' which is illustrated in FIG. 4 has pocket-shaped material cutouts 40 which, according to FIG. 4, are bounded at the front, and adjacent to the diaphragm floor 8 when they are arranged in an ultrasound sensor 2' (cf. FIG. 5), by an annular section 42. In the circumferential direction, the individual material cutouts 40' are bounded by material webs 43. In addition, the material cutouts 40' are bounded by an edge section 44 which lies opposite the edge section 42.

Figure 5:
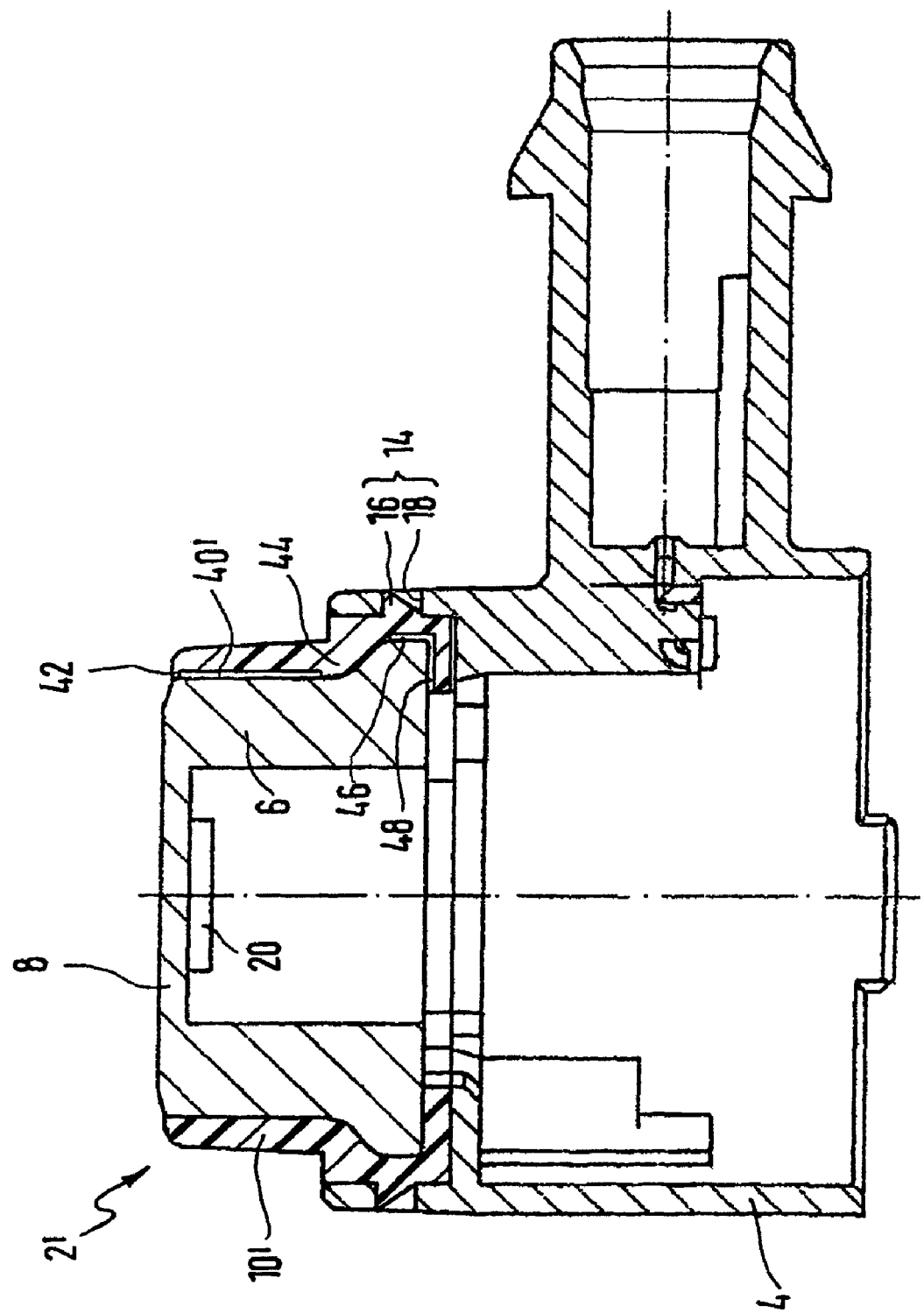
FIG. 5 is a sectional side view through a further embodiment of an ultrasound sensor according to the invention.

The position of the material cutouts 40' is also apparent from the sectional view which is illustrated in FIG. 5 and in which the decoupling element 10' is mounted in the ultrasound sensor 2'. The decoupling element 10' has, in addition to the material cutouts 40', further material cutouts 46 and 48. The material cutouts 46 are moved radially towards the outside with respect to the diaphragm 6. The material cutouts 48 decouple the diaphragm 6 from the housing 4 in the axial direction.

The invention claimed is:

1. A motor vehicle ultrasound sensor, comprising
   a housing, having a diaphragm which is mounted in or on a section of the housing, and having a decoupling element which extends at least partially between the diaphragm and the housing section,
   wherein the decoupling element and the housing section have latching means via which the decoupling element and the housing section are connected to one another, and
   wherein a plurality of latching means are provided along the circumference of the housing section and of the decoupling element, the plurality of latching means comprising:
      latching bodies provided on the decoupling element, and
      latching receptacles which are formed by openings in the housing section.

2. The ultrasound sensor according to claim 1, wherein the housing section and the decoupling element are embodied in an annular shape.

3. The ultrasound sensor according to claim 1, wherein the latching means are distributed uniformly along the circumference of the housing section and of the decoupling element.

4. The ultrasound sensor according to claim 1, wherein the decoupling element can be inserted into the housing section in a mounting direction which is opposed to the irradiation direction of the ultrasound sensor.

5. The ultrasound sensor according to claim 4, wherein the decoupling element and the housing section have at least one insertion section which tapers in relation to the mounting direction.

6. The ultrasound sensor according to claim 1, wherein at least one stop element, which interacts with a stop face formed on the housing or on the housing section, is formed on the decoupling element.

7. The ultrasound sensor according to claim 1, wherein at least one undercut region into which the diaphragm is inserted in a latching fashion is formed on the decoupling element.

8. The ultrasound sensor according to claim 7, wherein the undercut region is bounded at least partially by the stop element.

9. The ultrasound sensor according to claim 1, wherein the decoupling element has at least one material cutout on its side facing the diaphragm.

10. The ultrasound sensor according to claim 9, wherein the at least one material cutout is aligned in the radial direction with an edge section of the diaphragm, which edge section reinforces the diaphragm in the radial direction.

11. The ultrasound sensor according to claim 1, wherein the decoupling element has undercut elements which project into the housing of the ultrasound sensor and are surrounded by an embedding material which fills the interior of the housing.

12. The ultrasound sensor according to claim 1, wherein the decoupling element is formed from liquid silicone rubber (LSR).

13. A method for mounting an ultrasound sensor as claimed in claim 1, comprising:
    forming a first assembly by attaching a piezo element to the diaphragm floor of a diaphragm; and
    inserting the first assembly into a decoupling element in order to form a second assembly,
    wherein the second assembly is used to form a third assembly by latching into a housing section of a housing of the ultrasound sensor.

14. The method according to claim 13, wherein the first assembly is inserted into the decoupling element in a latching fashion.

15. The method according to claim 13, wherein the decoupling element is inserted into the housing section in a mounting direction which is opposed to the irradiation direction of the ultrasound sensor.

* * * * *